Re. 24,020

June 14, 1955

E. A. KRISTEN

AUTO BODY REPAIRING TOOL

Original Filed Jan. 10, 1951

INVENTOR.
EMIL A. KRISTEN
BY Carr & Carr & Gravely,
HIS ATTORNEYS.

United States Patent Office

Re. 24,020

Reissued June 14, 1955

24,020

AUTO BODY REPAIRING TOOL

Emil A. Kristen, St. Louis, Mo.

Original No. 2,651,276, dated September 8, 1953, Serial No. 205,376, January 10, 1951. Application for reissue April 29, 1954, Serial No. 426,622

9 Claims. (Cl. 113—111)

Figure 1:
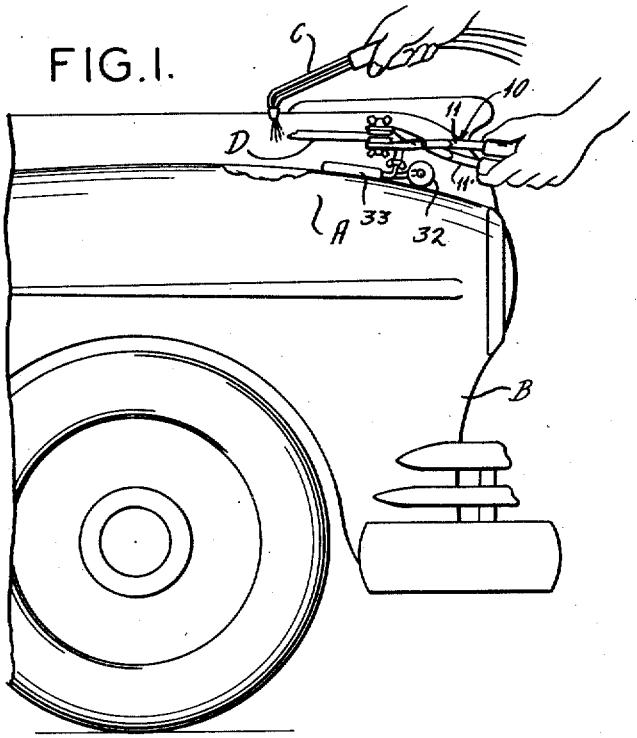

Matter enclosed in heavy brackets [ ] appears in the original patent but forms no part of this reissue specification; matter printed in italics indicates the additions made by reissue.

This invention relates in general to the art of filling and smoothing dented, welded, and uneven sheet metal or casting surfaces, such as damaged auto bodies, with molten solder.

The practice currently employed in the auto fender and body repair business, in performing such a filling operation, is to heat and tin the damaged sheet metal or casting surface (herein called "the work") and thereafter to melt from a bar of lead solder a sufficient mass thereof to apply to the work. The molten mass is dropped on the work in liquid or semi-liquid state, and a wooden paddle, dipped in oil to minimize burning, is utilized to press and smooth the molten solder to a relatively smooth contour slightly above the final desired contour. As a last step, the amount of solder projecting above the desired contour is ground off.

The primary purpose of the present invention is to provide a tool whereby the work of dent soldering may be improved both as to solidity and surface smoothness and the labor thereof rendered faster and easier.

Another object is to provide a tool for holding a bar of solder above the work in convenient position for depositing the solder thereon, and thereafter for smoothing, impacting, and rolling the molten solder to form a solid, smoothly contoured surface.

A further object of the invention is to provide a tool resting upon the work for supporting a solder bar during the melting operation conveniently for facile deposit of molten solder, regardless of the curvature and angle of the work.

It is an additional object of the present invention to provide heat resistant paddle and roller elements so mounted with respect to each other as to facilitate the impacting, rolling, and smoothing of molten solder to approach a desired contour.

With the above and other objects in view, my invention resides in the novel features of form, construction, arrangement, and combination of parts presently described and pointed out in the claims.

Figure 4:
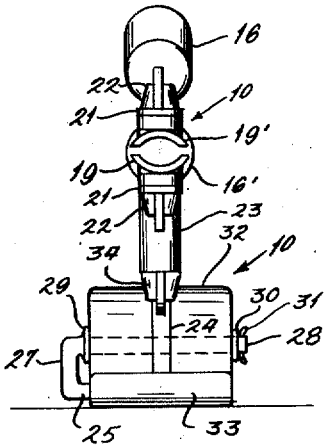
Figure 2:
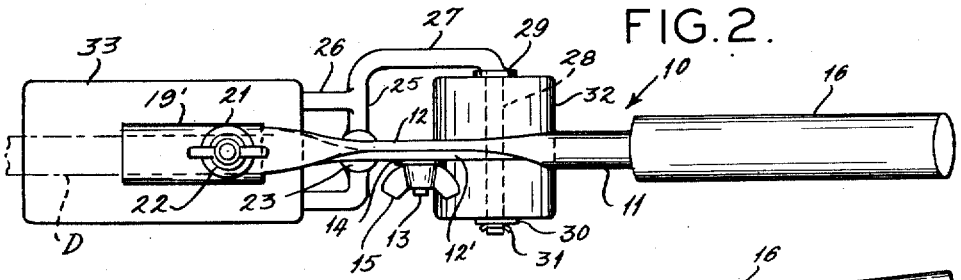
Figure 3:
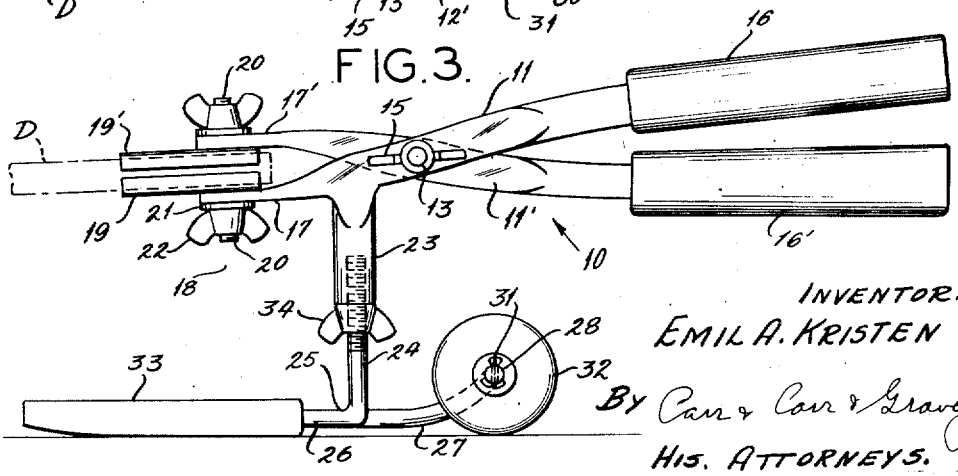

In the drawings:

Fig. 1 illustrates a dent soldering tool constructed in accordance with the present invention and the manner of using same, Fig. 2 is an enlarged plan view of the dent soldering tool shown in Fig. 1, Fig. 3 is a side elevational view of said dent soldering tool; and Fig. 4 is a front elevational view of said dent soldering tool.

*In its broad concept the auto body repairing tool comprises a device capable of holding a solder bar while being free of unnecessary weight so as to facilitate manipulation thereof. To this device is attached a solder smoothing means which is positioned to become immediately available as the solder is deposited and is still in a semi-fluid state, at least, to press and smooth the same into position. The solder holder may have movable jaws if desired and the smoothing means may be fixed relative to the holding device.*

Referring now by reference characters to the drawings, which illustrate a preferred embodiment of the invention, Fig. 1 shows the dent-filling tool, generally designated 10, in use on the sheet metal work surface A on an automobile B. The tool 10 is shown as held in the left hand of the operator, whose right hand holds an acetylene torch C in position for melting a grasped bar of solder D. It is also usable when the tool and torch are reversed. The construction of the tool is shown more clearly in Figs. 2, 3 and 4. It comprises essentially a pair of plier arms 11, 11' with midportions 12, 12' vertically flattened for increased strength and for scissor-like mounting on a countersunk bolt 13, said bolt being equipped with a washer 14 and a wing nut 15 by which the plier arms 11, 11' may be tightly secured, if desired, for continued grasping of the solder bar D. Aft of the bolt 13, the plier arms 11, 11' terminate in handles 16, 16' fabricated of any suitable heat-insulating material so that the operator may use the tool 10 without wearing gloves. Forward of the bolt 13 said plier arms 11, 11' terminate in opposed flattened nose portions 17, 17' drilled on a common normal axis designated 18 for mounting the angularly adjustable semi-oval opposed jaws 19, 19' by means of the countersunk bolts 20, washers 21, and wing nuts 22.

Fabricated integral with one plier arm 11, is a depending stem 23 axially tapped to receive the upstanding threaded end portion 24 of a preferably welded steel support frame 25. Said support frame 25 includes a forwardly extending yoke portion 26 and an arm portion 27 extending rearwardly and upwardly and bent transversely to form a shaft 28 having a flange 29 delimiting the inner end of its bearing surface, a washer 30, and a cotter pin 31 delimiting its outer end.

Mounted for rotation on the bearing surface of said shaft 28 is a roller 32 preferably molded of a heat-resistant material such as an asbestos fibre plastic. A removable paddle 33, formed of similar material, is mounted on the yoke portion 26 and extending somewhat beneath the support frame 25 so that the tool 10 will stand and be supported by the paddle 33 and roller 32 without touching any part of the frame 25 to the work.

The stem 23 functions as a support for the plier arms 11, 11' and the components associated therewith, and also as a spacing means for removing the solder bar D a selected distance from the work during the solder melting operation. To enable such distance to be fixed, a wing nut 34 is turned on the frame's threaded end portion 24 for locking engagement with, or release from, the stem 23. This construction also permits the roller and paddle to be rotatably adjusted about the axis of the stem.

In use, the operator inserts a solder bar D within the semi-oval jaws 19, 19' and clamps it by tightening the wing nut 15 to prevent opening of the plier arms 11, 11'. Thereafter the operator may, by manipulation of the jaw holding wing nuts 22, adjust the angularity of the solder bar D to the plier arms 11, 11' (which angularity is shown in Figs. 2, 3 and 4 at 180°), so that when the paddle 33 and roller 32 rest against a convenient portion of the surface of the automobile B, the forward portion of the solder bar D will extend directly over the point on the work A on which it is desired to deposit molten solder. For rotational adjustment and proper spacing of the solder bar from the work, the frame's threaded end portion 24 is screwed in or out of the stem 23 and secured by tightening the locking wing nut 34. While normally the paddle 33 will be aligned directly forwardly of the stem 23, angular adjustment is here made possible so as to permit the greatest ease of use on surfaces of varying angularity and curvature.

As soon as a sufficient amount of solder has been melted and fallen onto the work, the operator smooths and pats it in place with the paddle 33, whose position may be maintained steady in relation to the work because of the contact of the roller 32 against the surface. The roller 32 also facilitates fore and aft smoothing movements with paddle 33. Additionally, the roller 32 may be adjusted to forward position and used to roll the solder smoothly and impact it solidly into the work.

The use of the tool 10 has proved advantageous in many respects, notable among which are the following:

It permits more even delivery to the work of molten solder at a controlled temperature, and the immediate smoothing, rolling and impacting of the solder into the work. A smoother, better contoured and more even fill is produced, thus minimizing the subsequent grinding and filling operation. The work proceeds at a much more rapid rate than was formerly possible and aided by the angular and space adjustments described, with reduced effort. In addition, the tool 10 may be successfully used after a shorter training period than has been requisite for the conventional method. The tool eliminates wastage of lead or solder stock because the operator may use it down to all but the last half inch or less of the stock, which is not possible in the prior art devices.

It should be understood that changes and modifications in the form, construction, arrangement, and combination of the several parts of the dent soldering tool may be made and substituted for those being shown and described without departing from the nature and principle of the present invention.

Having thus described my invention, what I claim and desire to secure by Letters Patent is:

1. An auto body dent repairing tool comprising solder bar holding pliers having heat insulated handles and spaced nose positions, an angularly adjustable jaw element carried by each nose portion, said jaw elements having facing concave surfaces which cooperate to hold the solder bar, a stem projecting from said pliers, a support frame carried by said stem and having a forwardly extending projection underlying and spaced from said jaw elements, and a solder smoothing paddle of heat resistant asbestos fibre material carried by said forwardly extending projection, said paddle having a working face below the jaw elements and in position to follow the depositing of solder in a dent and effect a smoothing and pressing operation while the solder is in a semi-fluid state.

2. An auto body dent repairing tool comprising solder bar holding pliers having heat insulated handles and forwardly directed spaced nose portions, a jaw element carried by each nose portion with said jaw elements mounted for angular adjustment to hold a solder bar at an angle to the pliers and having cooperating concave faces, a stem projecting from said pliers, a support frame adjustably carried by said stem and having a forwardly extending projection spaced from said jaw elements, and a solder smoothing paddle formed from heat resistant asbestos fibre material carried on said forwardly extending projection, said paddle having a flat working face with an upswept portion at its forward end, the paddle being in position spaced from said solder holding jaw elements to follow the deposit of solder in a dent and smooth and press the same while in a semi-fluid state.

3. An auto body dent repairing tool comprising solder bar holding pliers having heat insulated handles and spaced nose portions, an adjustable jaw element mounted on each of said nose portions, said jaw elements having cooperating facing solder bar holding faces of concave shape, a stem projecting from said pliers, a support frame carried by said stem and having forwardly extending projections normally spaced from said jaw elements and a rearwardly extending projection spaced from said handles, a solder smoothing paddle formed from heat resistant asbestos fibre material carried by said forward projections, said paddle having a working face with an upswept portion at its forward end, and a roller formed from asbestos fibre material mounted on said rearward projection, said roller having a cylindrical working face substantially tangent to the plane of said paddle face, said paddle and roller being located at the same side of said solder bar holding jaw elements in position selectively to follow the deposit of solder in a dent and smooth and press the same while in a semi-fluid state.

4. An auto body dent repairing tool comprising solder bar holding pliers having heat insulated handles and spaced nose portions, a stem projecting from said pliers, a support frame adjustably carried by said stem and having a forwardly extending projection underlying said nose portions, and a solder smoothing paddle carried by said projection, said paddle having a working face normally positioned below said nose portions and in position to follow the depositing of solder in a dent and effect a smoothing and pressing operation while the solder is in a semi-fluid state.

5. An auto body dent repairing tool comprising solder bar holding pliers having heat insulated handles and spaced nose portions, a stem projecting from said pliers, a support frame carried by said stem and having forwardly and rearwardly disposed projections normally underlying said nose portions and insulated handles, and a solder smoothing paddle fixed to one of said projections, and a roller mounted on the other projection.

6. An auto body dent repairing tool comprising solder bar holding pliers having heat insulated handles and spaced nose portions, an adjustable jaw element mounted on each of said nose portions, said jaw elements having cooperating facing solder bar holding faces of concave shape, a stem projecting from said pliers, a support frame angularly adjustably carried by said stem and having forwardly extending projections normally spaced from said jaw elements and a rearwardly extending projection normally spaced from said handles, a solder smoothing paddle formed from heat resistant asbestos fibre material carried by said forward projections, said paddle having a working face with an upswept portion at its forward end, and a roller formed from asbestos fibre material mounted on said rearward projection, said roller having a cylindrical working face substantially tangent to the plane of said paddle face, said paddle and roller being located at the same side of said solder bar holding jaw elements in position selectively upon adjustment of said support frame to follow the deposit of solder in a dent and smooth and press the same while in a semi-fluid state.

*7. An auto body dent repairing tool comprising a support frame, solder bar holding pliers including a handle and solder bar holding jaws, said pliers being rigidly attached to an upper portion of said support frame, a solder bar smoothing paddle rigidly attached to a lower portion of said support frame in vertically spaced, underlying relation to said solder bar holding jaws, said paddle being of material resistant to solder adherence such as to smoothly pass over molten solder without adhering thereto, whereby solder held by said jaws and deposited in advance of said paddle may be smoothed and pressed by the paddle while the solder is in a semi-fluid state.*

*8. An auto body dent repairing tool comprising solder bar holding pliers having handle operated spaced nose portions with solder bar gripping surfaces, a vertical support attached at its upper end to said holding pliers, said support having a forwardly extending projection at its lower end, a solder smoothing paddle carried by said projection and extending therefrom in vertically spaced, underlying relation to said nose portions, said paddle being of material resistant to solder adherence such as to smoothly pass over molten solder without adhering thereto, whereby solder held by said nose portions between said solder bar gripping surfaces and deposited in advance of said paddle may be pressed and smoothed by the paddle while the solder is in a semi-fluid state.*

*9. An auto body dent repairing tool comprising a solder bar holding device including a solder bar engaging and holding portion, a solder smoothing and pressing paddle disposed in fixed vertically spaced underlying relation to said solder bar engaging and holding portion, and support means extending vertically between and connected to said holding device and said paddle to maintain said solder bar engaging and holding portion and said paddle in their stated fixed vertically spaced relation, said paddle being of material resistant to solder adherence such as to smoothly pass over molten solder without adhering thereto, whereby solder held by said holding device and deposited in advance of said paddle may be smoothed and pressed by the paddle while the solder is in a semi-fluid state.*

References Cited in the file of this patent or the original patent

UNITED STATES PATENTS

| | | |
|---|---|---|
| 222,186 | Hill | Dec. 2, 1879 |
| 274,232 | Thayer | Mar. 20, 1883 |
| 410,330 | Porterfield et al. | Sept. 3, 1889 |
| 1,488,932 | Menyhart | Apr. 1, 1924 |
| 1,515,915 | Valenta | Nov. 18, 1924 |
| 1,611,738 | Guilford | Dec. 21, 1926 |
| 1,640,883 | Coleman | Aug. 30, 1927 |
| 1,692,911 | Vaughn | Nov. 27, 1928 |
| 1,795,256 | Johnson | Mar. 3, 1931 |
| 1,823,204 | Long | Sept. 15, 1931 |
| 1,938,630 | Kuula | Dec. 12, 1933 |
| 1,938,819 | Eskilson | Dec. 12, 1933 |
| 2,328,271 | Greene | Aug. 31, 1943 |
| 2,456,194 | Hughes | Dec. 14, 1948 |
| 2,514,736 | Zana et al. | July 11, 1950 |
| 2,594,878 | Davis | Apr. 20, 1952 |